E. McKESSON.
Side-Hill Plow.
No. 45,929.
Patented Jan 17. 1865
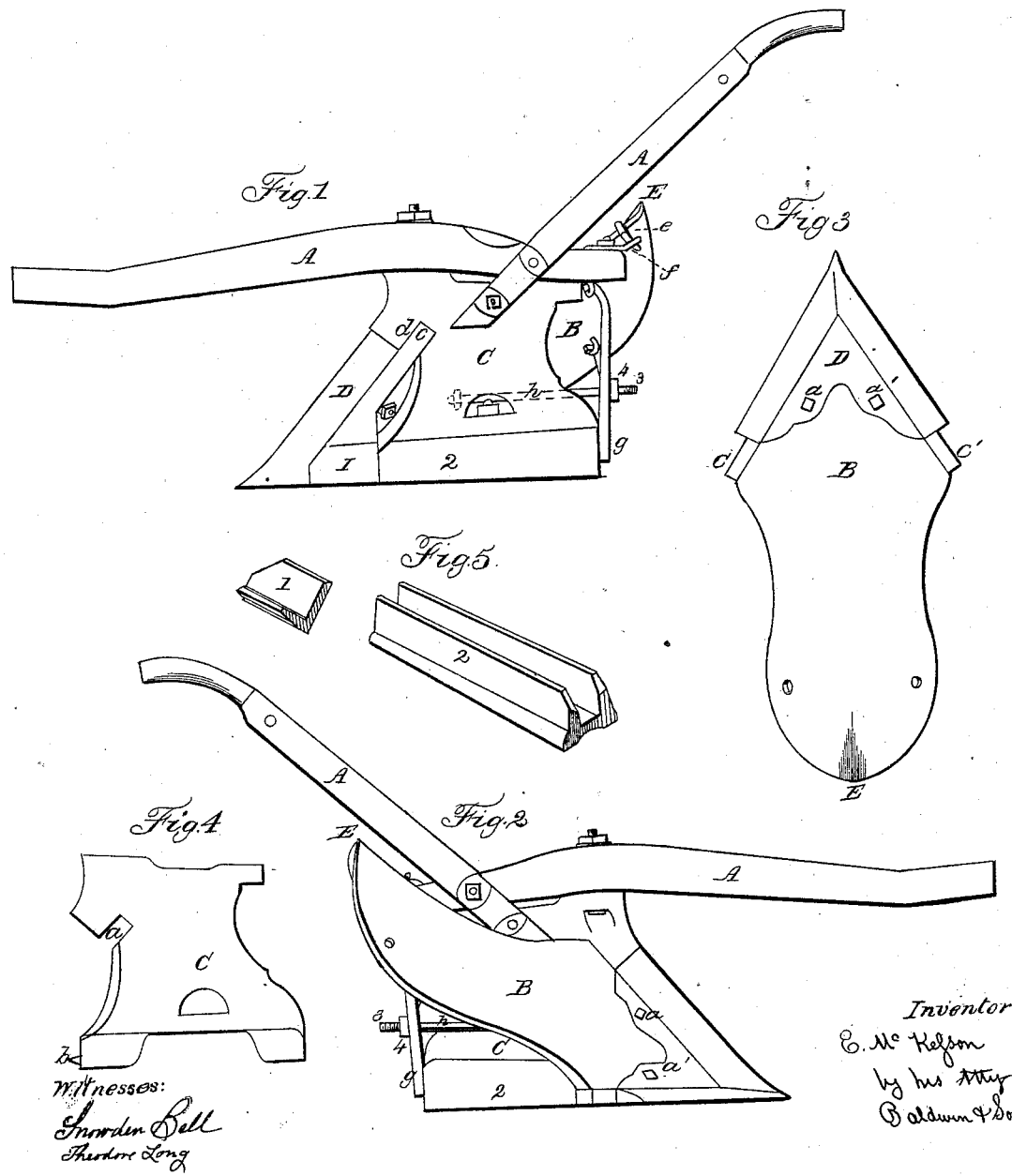

UNITED STATES PATENT OFFICE.

ELIJAH McKESSON, OF PHILIPS MILLS, PENNSYLVANIA.

IMPROVEMENT IN SIDEHILL-PLOWS.

Specification forming part of Letters Patent No. 45,929, dated January 17, 1865.

*To all whom it may concern:*

Be it known that I, ELIJAH MCKESSON, of Philips Mills, in the county of Indiana and State of Pennsylvania, have invented a new and useful Improvement in Hillside-Plows; and I do hereby declare that the following is a full, clear, and exact description thereof, reference being had to the accompanying drawings, and to the letters of reference marked thereon, in which—

Figure 1 is a view, in elevation, of the landside of a plow with my improvements. Fig. 2 is a view, in elevation, of the mold-board side of the plow. Fig. 3 is a plan view of the mold-board with the share attached. Fig. 4 is a detached view of the landside, and Fig. 5 is a view of the shoe detached from the landside and mold board.

The object of my improvement is to afford a perfect protection to the hinge or pivot on which the share and mold-board turn, give them a firm support, and render the latter readily adjustable to the depth of plowing; and to this end my invention consists in giving the rear of the double mold-board a pointed central extension by forming it in regular curves that meet in the extended point to fully turn the land from the furrow alike on both sides, while the front of the mold-board forms a secure rest for the right-angled share and the terminating front angle thereof forms the connection between the share and landside to render the movement of the plow steady in the same plane whichever way it may be moving, and in the attachment to the bottom of the landside and mold-board of a shifting or changeable shoe which shall have corresponding bearings to the mold-board, whether turning the land to the right or left, so that those portions of the landside and mold-board most liable to rapid wear can be cheaply renewed.

In the drawings the beam and handles A A are represented as of wood, but by a slight change in the top of the landside beams and handles of iron may be as readily used.

The mold-board B terminates in a right angle at its forward end and has the right-angled share D snugly fitted to its outer side and fastened securely by bolts *a* and *a'*, so that its entire outer surface constitutes a curved plane of proper inclination to pass into the ground and carry and turn over the land from each furrow with the least possible friction. On the under side the mold-board is fitted snugly to the front of the landside, which carries a pin *b*, that enters a hole in the center of the angle of the under side of the mold-board, and thus the pivot or hinge on which the mold-board and share turn when the plow is to be reversed is always prevented from clogging or wearing by being kept out of any possible contact with the ground. The triangular form of the front of the mold-board enables it to be made of similar form on both edges, and the corners *c* and *c'* are formed to enter and rest in the mortise *d* of the landside C alike when turning the land either to the right or left, and as the share D is also formed in a right angle and secured to the mold-board, either wing gives a secure support to the opposite cutting-edge and keeps it vertical, or as nearly so as the work requires, and of course always does this to whichever side the land may be thrown.

The mold-board is made symmetrical on both sides of its upper or outer surface, and that each side may give the proper curve to the several lands cut from the furrow and certainly and uniformly turn down the sward, I extend the rear of the mold-board to a point E, that shall extend above the land in passing and curve over it sufficiently to reverse its plowed surface and bring the sward on the next furrow, and as the rear of the landside is supported by the base of its front edge, the base of the triangular share and the notch on the landside, as well as by the brace-rod *e* from the beam, its movements will necessarily be perfectly steady and uniformly smooth, however stiff or rugged the soil on which it is worked, or when the land is turned from either side of the mold-board.

The brace-rod *e*, that connects the rear of the mold-board B with and supports it from the beam A, is swiveled or hinged at one end to a slotted plate *f*, having a bolt and nut to secure it to the beam, while its opposite end is so curved as to catch in a hole on the upper edge of the mold-board, which is itself held by a bifurcated brace *g* and screw-rod *h*. The slotted plate admits of any desired change of position for the joint of the brace-rod by relaxing the nut, and when the mold-board is adjusted to the depth of plowing required and the nut fastened, the brace-rod will be firm. By this simple device I am enabled to vary the position of the mold-board to any extent that its proper connection with the landside-notch $d$ will permit.

To readily replace at a moderate cost those portions of the landside and mold-board which wear most rapidly, I use a separate shoe for each, as shown at 1 and 2 in Fig. 5. These are respectively attached in position by bolts and nuts or screws alone, and must be so formed that they will be continuous from the heel of the landside to the point of the share in a proper curve to give the desired draft on the furrow side on whichever hand the land may be turned.

When my plow is to be used, the beam and handles are suitably attached to the landside, and its shoe 2 is put in place, the mold-board and share are united by their bolts $a$ and $a'$, and the shoe 1 is attached. Then the mold-board is placed on the pin in the front end of the landside, and one of its corners $c$ or $c'$ is inserted in the notch $d$ of the landside and the brace-rod attached to the rear of the upper side of the mold-board.

The under side of the mold-board carries suitable loops to receive hooks on the bifurcated end of brace $g$, as shown in the drawings, while its other end carries a pin that is inserted into a hole in the rear of the landside. The rod $h$ is hooked to a loop in the forward under side of the mold-board, passes through the bifurcated brace $g$, and is tightened thereon by a screw and nut 3 4. When at the end of the furrow, the plow is turned round, and by withdrawing the bent end of the brace-bar $e$ from the hole in the mold-board the mold-board and share can be readily swung under the beam on the pivots on the landside and bifurcated brace $g$ to the reverse side of the beam and the brace-rod $e$ turned and its hooked end attached to the hole in the opposite rear side of the mold-board, when the plow is again ready to proceed, and will lay its new land next the former one and with its sward turned under.

What I claim as my invention, and desire to secure by Letters Patent, is—

The double mold-board having a triangular front corners to lock in the groove of the landside, and a pointed projecting termination constructed, arranged, and operating substantially as and for the purposes set forth.

In testimony whereof I have hereunto subscribed my name.

ELIJAH McKESSON.

Witnesses:
S. B. STEWART,
W. H. COLEMAN.